Dec. 29, 1925.  1,567,284
F. B. MILLER
METHOD AND APPARATUS FOR FORMING CANDY WHISTLES
Filed Feb. 21, 1925
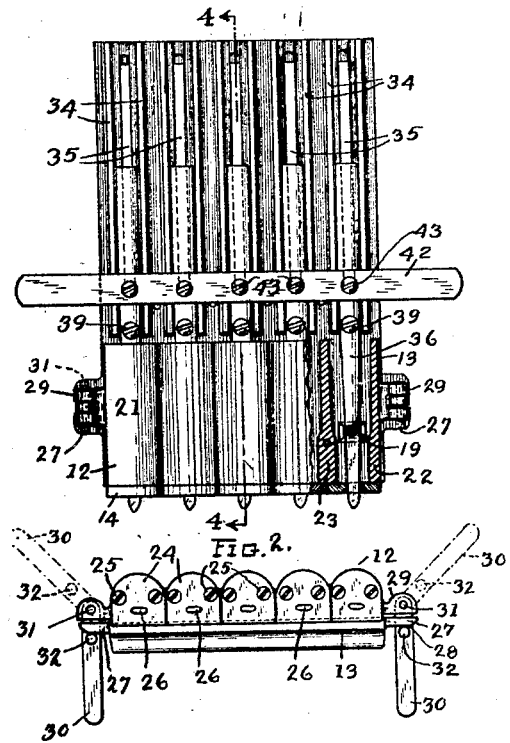
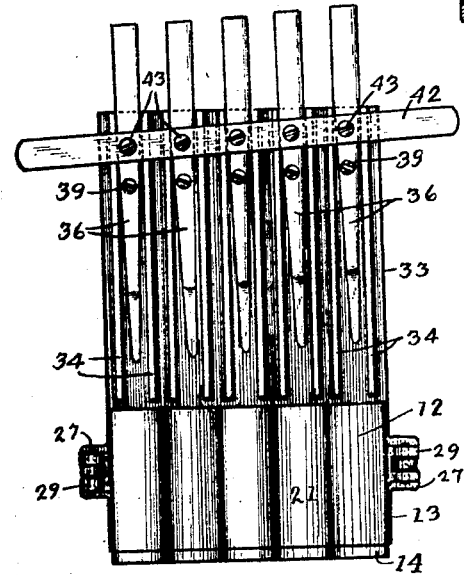
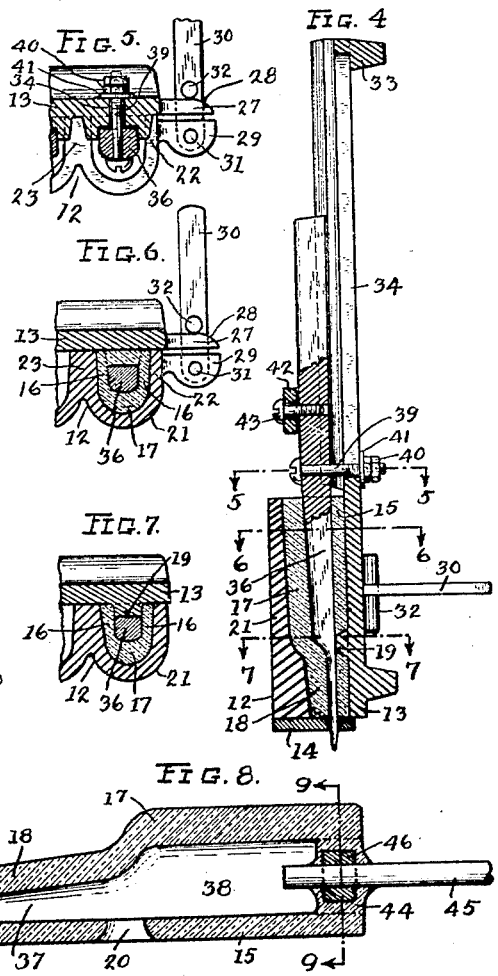
Inventor
Frank B. Miller
By Lloyd L. Evans
Attorney Patented Dec. 29, 1925.

1,567,284

UNITED STATES PATENT OFFICE.

FRANK B. MILLER, OF NORWALK, OHIO.

METHOD AND APPARATUS FOR FORMING CANDY WHISTLES.

Application filed February 21, 1925. Serial No. 10,828.

*To all whom it may concern:*

Be it known that I, FRANK B. MILLER, a citizen of the United States, residing at Norwalk, in the county of Huron and State of Ohio, have invented a certain new and useful Improvement in Methods and Apparatus for Forming Candy Whistles, of which the following is a full, clear, and exact description, reference being had to the accompanying drawings.

My invention relates to the method of and apparatus for molding whistles of an edible substance, such as sugar or the like.

One of the objects of my invention is to provide a molding apparatus in which the main portion of one or more candy whistles can be cast without waste of material, and in a minimum length of time and number of operations.

Another object of my invention resides in providing a mold for casting the main body of candy whistles, with which cores are associated so that they can be readily inserted in the proper relation in the mold, or removed therefrom by a single operation.

Still another object of the invention resides in the method employed for forming a whistle entirely of sugar, or the like.

These and other objects, and the invention itself, will be more fully set forth in the following specification.

In the accompanying drawing:

Fig. 1 is a front elevation of a molding apparatus embodying my invention;

Fig. 2 is a bottom view of the same;

Fig. 3 is a front elevation of the apparatus with the cores removed from the mold;

Fig. 4 is a vertical section of the mold taken on line 4—4 of Fig. 1, showing a whistle in the process of being cast;

Fig. 5 is a transverse section of the apparatus taken on line 5—5 of Fig. 4;

Fig. 6 is a transverse section of the apparatus taken on line 6—6 of Fig. 4;

Fig. 7 is a transvrese section of the apparatus taken on line 7—7 of Fig. 4;

Fig. 8 is a longitudinal section of the complete candy whistle;

Fig. 9 is a section of the whistle taken on line 9—9 of Fig. 8;

Fig. 10 is a perspective view of the whistle.

Referring more particularly to the drawings by characters of reference, I have preferably illustrated a molding apparatus in which a plurality of similar bodies of candy whistles can be molded during a single casting operation. The mold consists of a pair of sections, of which 12 is the front section and 13 the rear section, and an end closure section 14. The pair of sections are arranged to be releasably secured together, with their adjacent faces forming matrices into which sugar, in molten or liquid form, can be cast into the desired shape. In Figs. 8 to 10, is illustrated the design of whistle body which I prefer to form, and the same consists of a straight flat bottom wall 15, side walls 16 curving from the bottom wall and a curved top wall 17. One end of the hollow body terminates in a mouthpiece 18 of a similar outline, but reduced in cross section, the top and side walls sloping toward the end and having shoulders forming the junction with the main portion of the body.

The rear mold section 13 is flat and rectangular in outline and is provided with studs 19 which extend from the front wall thereof and are arranged to form an air outlet passage 20 in the bottom wall of each of the whistle bodies. The front mold section 12 is provided with a transverse wall 21, side walls 22 and similar partition walls 23 which extend rearwardly parallel with the side walls. When the pair of sections are placed together they form a plurality of similar matrices 11 which are open at both ends and are shaped to form the exterior surface of the main body of the whistle. A plurality of cover plates 24 form the end mold section 14, and are arranged to enclose the opening at the bottom of the front section and are secured to the ends thereof by screws 25. The cover plates are of a size to extend under the lower end of the rear section when the pair of sections are secured together for a casting operation. The cover plates are each provided with a transversely extending slot 26 therethrough, into which cores can be projected.

The front and rear sections are secured together by releasable clamping mechanism which forms a part thereof. The rear section is provided with a shoulder extension 27 at each side having a rear cam face 28. The front mold section is provided with brackets 29 which extend from each side thereof and are arranged to lie adjacent the shoulders 27 of the rear section. A lever 30 is pivotally secured to each of the brackets adjacent their ends by a pin 31, and are each provided with a projecting stud 32 rigidly secured thereto. The studs 32 are so spaced from the pivot pins, that they will ride over the cam faces on the shoulders of the rear section, and will clamp the sections together when the levers are swung rearwardly. By swinging the levers forwardly, the front and rear mold sections can be detached.

The rear section of the pair of molds is longer than the front section and when the sections are placed together, the upper end of the rear section provides what I term an extension 33. The front face of the extension is provided with forwardly extending ribs 34 which are parallel and extend in a vertical plane. The ribs are arranged in pairs and each pair is in alignment with the open end of one of the matrices, being designed and arranged to form guideways to direct the cores into the matrices in a uniform manner. The extension intermediate each pair of ribs is provided with a slot 35 extending substantially the entire length thereof and parallel with the ribs.

A core member 36 is arranged to be reciprocated in each of the guideways of the extension so that they can be inserted through the open upper ends of the mold into the matrices. The cores, at their lower ends, are formed in the same shape as the design of the matrices, being of a smaller outline so that they will form the inlet air passage 37 in the mouth piece and the air chamber 38 in the main portion of the whistle body. The lower end of the cores are of such shape that they can project through the apertures 26 in the end mold section, and are designed to close the same so that the passages 37 will be open at the ends of the mouth pieces. The cores are considerably longer than the matrices, and the upper ends are of slightly less width than the guideways in which they slide. The studs 19 are of such length that their ends abut against the core when the core is inserted in the matrices, thus forming the air outlet passage 20.

The cores are slidably retained in the guideways by bolts 39. The bolts extend through the cores and the slots in the extension of the rear section, and are each secured by a pair of nuts 40 which engage a washer 41 bearing against the rear face of the rear mold section. A cross bar 42 extends transversely across the front face of the upper portion of the cores and is secured therewith by screws 43. The ends of the cross bar extend beyond the sides of the mold extension and provide handles by which the operator can move the cores in unison into, or out of, the matrices. The cores are pivotally mounted upon the screws 43 and the bolts 39 so that when elevated they can be tilted to one side, as shown in Fig. 3, to prevent their downward displacement.

When the cores are in position in the matrices, as shown in Figs. 1 and 4, sugar in liquid form can be poured into the upper end of the matrices intermediate the core and the mold. When the sugar has become hardened the cores are removed, and the front and rear sections are separated to remove the bodies of the whistles.

It will be observed that the apparatus above described, will mold the whistle bodies having the end opposite the mouth piece open.

After the cores have been removed from the mold the open ends of the whistle bodies are closed, preferably by molding an end wall 44 thereacross, the end walls being preferably formed of molten candy in liquid or plastic condition. A handle 45 may be inserted into the open end of each body prior to the forming of the end walls and be so maintained during the molding of the end walls, thus becoming embedded therein.

A reinforcing member 46 may be provided, if desired, which contains an aperture through which the end of the handle may be pressed so that they are thereby retained together. The handle, especially if the piece 46 be used, may be dipped into molten sugar until a sufficient amount is carried on the handle to close the end of the body of the whistle. It is to be understood, however, that the handle may be used without the piece 46 and may be inserted in the body of the whistle in various ways without departing from my invention. For example, the handle may be held in a suitable support and molten sugar flowed around it and then the body of the whistle may be inserted around the handle to engage the molten sugar and thus form the end wall of the whistle.

By blowing into the chamber through the passage in the mouth piece of the whistle, a whistling noise will be emitted from the air outlet 20 leading from the chamber, and thus the whistle can be used to make a noise, as well as providing an article of confection.

Various changes can be made in the method of forming the whistle and the apparatus for casting the body thereof without departing from the spirit of my invention and the scope of what I claim.

What I claim is:

1. A molding apparatus for forming the hollow body of a candy whistle, comprising a mold having an aperture through one end and being open at the other end, a stud projecting inwardly in said mold for forming an air outlet passage for the hollow body, and a core reciprocable through the open end of said mold for forming an air chamber and inlet passage in the whistle body, said core projecting into and closing the aperture in the end of said mold and bearing against said stud when inserted into the mold.

2. A molding apparatus for forming the body of a candy whistle, comprising a pair of mold sections, an end mold section having an aperture therethrough, said sections forming a matrix with an open end, a stud extending into the matrix from one of said pair of sections for forming an air passage, and a core reciprocable through the open end of the matrix, said core projecting into and closing the aperture in said end section and bearing against said stud when inserted in the mold for a casting operation, said core being of a design to form an air chamber and an inlet passage in the body.

3. A molding apparatus for forming the body of a candy whistle, comprising a pair of separable complementary mold sections forming a matrix open at both ends, an end closure section secured to one of said sections for closing one end of the matrix, said section having an aperture therethrough, a stud extending into the matrix from one of the pair of sections, and a reciprocable core extending through the matrix in engagement with the end of said stud and extending through and closing the aperture in said end closure section, said core being of a design to provide an air chamber and an air inlet passage within the whistle body.

4. A mold for forming the body of a candy whistle, comprising a pair of complementary sections providing a matrix, a stud extending into the matrix from one of said sections for forming an air passage, a shoulder extending from each side of said sections, a lever pivoted to one of said shoulders at each side, and a cam on each of said levers for clamping the adjacent shoulders of the two sections together, and a core extending into the matrix bearing against the end of said stud for forming an air chamber and an air inlet passage leading thereto within the whistle body.

5. A molding apparatus, comprising a mold open at one end providing a matrix, a slotted extension at the open end of said mold, a reciprocable core movable into said matrix, and securing means extending through the slot in the extension for retaining the core therewith.

6. A molding apparatus, comprising a mold open at one end providing a matrix, an extension at the open end of said mold, a guideway on said extension in alignment with the matrix in said mold, and a core slidable in said guideway and said matrix.

7. A molding apparatus, comprising a mold open at one end providing a matrix, an extension at the open end of the mold, spaced ribs extending from the extension forming a guideway in vertical alignment with the matrix, a core slidable in said guideway and said matrix, and means for retaining said core with said extension.

8. A molding apparatus, comprising a mold open at one end providing a matrix, an extension at the open end of said mold, ribs extending from said extension forming a guideway in alignment with the open end of said matrix, said extension being slotted parallel with said ribs, a core slidable in said guideway and movable into and out of the matrix in said mold, and a bolt secured to slide in the slot in said guideway, said core being pivotally secured to said bolt.

9. An apparatus for molding a plurality of whistle bodies, comprising a mold having a plurality of matrices arranged side by side and designed to form a body having a mouth piece extending in alignment therewith, said mold being open at one end of the matrices, an extension at the open end of said mold, guideways extending from said extension in alignment with the open matrices, said extension having slots intermediate said guideway sides, cores slidable in said guideways, said cores being designed to form an air chamber in the body and an air inlet passage in the mouth piece, means slidable in the slots in said extension for retaining said cores with said extension, and an element to which all of said cores are secured for reciprocating them in unison.

10. An apparatus for molding a plurality of similar candy whistle bodies, comprising a mold providing a plurality of matrices open at one end for forming a whistle body including a mouth piece, an extension at the open end of said mold having ribs extending therefrom forming guideways in alignment with said matrices, said extension having slots therein parallel with and intermediate the said ribs, cores slidable in said guideways and said matrices, said cores forming an air chamber in the whistle body and an air inlet passage in the mouth piece, means slidable in the slots in said extension for retaining said cores within said guideways, said cores being pivotally connected with said slidable means, and a transversely extending element connected to said cores, said cores being tiltable in said guideways when removed from said matrices to engage said ribs and prevent vertical displacement thereof.

11. A method for forming candy whistles, consisting in first casting molten sugar into a hollow body having an open end, a mouth piece at the other end, an air outlet passage in the body, and an air inlet passage through the mouth piece, then closing the open end of the hollow body by casting an end wall across the open portion thereof.

12. The method of forming a candy article comprising, casting in a suitable mold a body of candy, forming, by means of suitable cores, an inlet and outlet and an enlarged air chamber, withdrawing the core forming the air chamber through an open end of the body, and closing said open end by means of an end wall of candy.

13. The method of forming a candy article comprising, casting in a suitable mold a body of candy, forming, by means of a suitable core, a passage through said body comprising a restricted inlet passage and an air chamber, withdrawing the core forming the air chamber through an open end in the body, and closing said open end by molding molten candy around a handle and forming from the molten candy an end wall for said hollow body.

14. The method of forming a plurality of candy articles comprising, simultaneously casting in a suitable multiple mold a plurality of open ended hollow bodies of candy, forming in each of said bodies an inlet passage, an outlet passage and an air chamber by means of suitable cores, and closing the open end of each hollow body with an end wall having a handle embedded therein.

15. The method of forming a candy article comprising, casting a body of candy about a core to form an open ended chamber therein, withdrawing said core, and subsequently closing said open end of the chamber by an end wall carrying a handle.

16. A molding apparatus for forming a candy whistle body, comprising mold sections providing a hollow matrix with oppositely disposed openings, and an independent core member for forming an air inlet passage and an air chamber, said core member being reciprocable through one of the matrix openings and closing the other matrix opening when positioned for a molding operation.

17. A molding apparatus for forming a candy whistle body, comprising mold sections providing a hollow matrix having oppositely disposed openings, and an independent core member for forming an air inlet passage terminating in a chamber in the candy body, said core member being reciprocable through one of the matrix openings and closing the other matrix opening when positioned for a molding operation, one of said mold sections having an interiorly extending stud against which said core bears to form an air outlet passage through the candy body.

In testimony whereof, I hereunto affix my signature.

FRANK B. MILLER.